United States Patent [19]

Covington et al.

[11] Patent Number: 5,074,753
[45] Date of Patent: Dec. 24, 1991

[54] ROTOR BLADE

[75] Inventors: Cecil E. Covington, Hurst; Ernst C. Schellhase, Fort Worth; Madison K. Robinson, Bedford, all of Tex.

[73] Assignee: Bell Helicopter Textron Inc., Fort Worth, Tex.

[21] Appl. No.: 422,118

[22] Filed: Oct. 16, 1989

[51] Int. Cl.⁵ .................. B64C 27/48; B64C 11/26
[52] U.S. Cl. .................. 416/141; 416/142; 416/223 R; 416/229 R; 416/241 R
[58] Field of Search .......... 416/131, 141, 142, 204 R, 416/222, 229 R, 230, 238, 239

[56] References Cited

U.S. PATENT DOCUMENTS

| | | | |
|---|---|---|---|
| 2,369,276 | 2/1945 | Cameron et al. | 416/131 |
| 2,546,881 | 3/1951 | Avery | 416/114 |
| 2,980,395 | 4/1961 | Rubbra et al. | 416/131 |
| 3,321,019 | 5/1967 | Dmitroff et al. | 416/229 |
| 3,528,753 | 9/1970 | Ditton et al. | 416/226 |
| 3,713,753 | 1/1973 | Brunsch | 416/226 |
| 3,754,840 | 8/1973 | Zincone | 416/226 |
| 3,782,856 | 1/1974 | Salkind et al. | 416/226 |
| 3,813,186 | 5/1974 | Palachek et al. | 416/226 |
| 3,829,240 | 8/1974 | Edenborough et al. | 416/223 |
| 3,942,231 | 3/1976 | Whitaker | 416/230 R X |
| 3,950,115 | 4/1976 | Euler | 416/230 A |
| 3,967,996 | 7/1976 | Kamov et al. | 157/156 |
| 4,038,885 | 8/1977 | Jonda | 416/141 |
| 4,083,656 | 4/1978 | Braswell et al. | 416/226 |
| 4,247,255 | 1/1981 | De Rosa | 416/230 AX |
| 4,255,087 | 3/1981 | Wackerle et al. | 416/230 A |
| 4,273,511 | 6/1981 | Mouille et al. | 416/141 X |
| 4,626,173 | 12/1986 | Mouille et al. | 416/230 A X |
| 4,696,623 | 9/1987 | Bost | 416/230 A |

FOREIGN PATENT DOCUMENTS

| | | | |
|---|---|---|---|
| 621315 | 7/1949 | United Kingdom | 416/131 |
| 909617 | 10/1962 | United Kingdom | |
| 1427158 | 3/1976 | United Kingdom | |

Primary Examiner—Edward K. Look
Assistant Examiner—James A. Larson
Attorney, Agent, or Firm—Richards, Medlock & Andrews

[57] ABSTRACT

A composite rotor blade comprising an outboard portion defining an airfoil surface, an inboard portion defining an end tang having a mounting section and an extension lug section. The mounting section of the end tang having at least one mounting aperture with an axis parallel to the chordline of the airfoil for mounting of the blade, and the extension lug section having at least one extension lug extending inboard of the mounting aperture to provide a lever surface for interaction with suitable mounting mechanisms.

18 Claims, 4 Drawing Sheets

ROTOR BLADE

This invention was made with Government support under N00019-83-C-0166 awarded by Department of the Navy, Naval Air Systems Command. The Government has certain rights in this invention.

TECHNICAL FIELD OF THE INVENTION

The present invention relates to construction of rotor blades for use in helicopters and VSTOL aircraft and in particular to a blade construction suitable for folding rotor blade systems.

BACKGROUND OF THE INVENTION

Rotor blades for helicopters are well known. Rotor blades are also used in vertical and short take off and landing (VSTOL) aircraft. In particular, rotor blades are utilized on VSTOL aircraft in which the rotor blade pivots in relation to the aircraft such that it may provide vertical lift or be rotated to provide horizontal thrust. Typically, rotor blades are long and extend beyond the fuselage of the aircraft. It is thus advantageous to be able to provide a blade which can be folded during shipment or storage so that the blade occupies less space without the need for removal of the blade or blades from the aircraft. Also, recently fiber composite blades have achieved widespread use and have many advantages over metal rotor blades. However, composite blades present unique problems in fabrication and design in order to make a blade which is useful in a folding blade system.

Use of composite materials in rotary blades is attractive because they have unique properties and the structure of composites as well the laminates made from the composites can be tailored to meet specific performance requirements. Composites are based on the controlled distribution of reinforcement material, which may be of one or more materials, in a continuous phase of a matrix material. The composite sheet is formed by arranging the reinforcement material in a desired orientation and covering the reinforcement with the matrix system. These are then typically rolled or otherwise handled to spread the reinforcement evenly and to produce uniform thickness for a sheet. This creates an impregnated system which is partially cured to fix the geometry of the sheet while allowing enough shaped relaxation (drape) and adherence (tack) to permit complex shapes to be built up from the composite sheets thus formed. Prior to cure these composite sheets are referred to as prepreg sheets. In preparation of a laminate part, sheets of composite material are arranged in the desired orientation. In a typical fabrication of complex part the multiple sheets of prepreg material are assembled in the desired orientation. This process is called layup. After layup, the structure formed is cured which bonds the sheets of composite together to form the finished laminated part.

The present invention provides for the construction of a rotor blade which is suitable for producing a composite rotor blade having a design especially suited for folding of the blades to permit for storage without removal of the blade from the aircraft.

SUMMARY OF THE INVENTION

A rotor blade structure is provided consisting of an outboard end forming an airfoil surface to provide aerodynamic lift and which defines a chordline and rotor beam. Attached to the inboard end of the rotor blade is an end tang having a mounting section and an extension lug section. The end tang provides a mounting aperture(s) with an axis parallel to the chordline of the airfoil and an extension lug extending inboard of the aperture to provide lever (faying) surfaces to resist beamwise bending. In the preferred embodiment, the inboard end tang has fore and aft spaced apart tang extensions which extend in planes substantially parallel to the beam of the rotor blade. Each end tang extension defines a mounting aperture which is aligned on an axis substantially parallel to the chordline of the rotor blade and said each end tang extend inboard of the apertures to define an extension lug having lever surfaces. The apertures on the fore and aft end tang extensions are preferably co-axially aligned.

The rotor blade is of composite construction and a plurality of filament reinforced composite belts extend from the outboard portion of the airfoil to form the end tang. A first plurality of the filament reinforced composite belts extends inboard from the outboard end of the rotor blade and extends part way into the end tang to wrap around the mounting aperture which has an axis substantially parallel to the chordline of the outboard part of the blade. A second plurality of filament reinforced composite belts extends inboard from the outboard portion of the blade and forms a tang extension inboard of the mounting aperture. In the preferred embodiment, these belts are spaced apart and laminated with shear webs of composite laminates as well as fillers of composite laminates to define a mounting aperture and also to define the extension lug. The belts, shear web, and filler webs are laminated together to form a composite end tang with a rotor blade.

This construction is advantageous in that it permits the conducting of blade bending loads inboard of the mounting (retention) aperture, which avoids the need to extend the rotor hub beyond the aperture making a more compact arrangement when the blade is folded.

BRIEF DESCRIPTION OF THE DRAWINGS

The present invention can be better understood upon review of the drawings and the detailed description which illustrate a preferred embodiment of the invention and other embodiments of the invention will be apparent to those skilled in the art.

DETAILED DESCRIPTION

Conventional rotor blades are typically attached to the hub of an aircraft by means of two bolts which pass through the blade approximately perpendicular to the chordline, and the bolts are located at the blade root. In these configurations, all loads are reacted out through the bolts, the principle loads in this area are the beamwise bending, chordwise bending, torsion and centrifugal forces applied to the airfoil portion of the rotor blade. In contrast, in the present invention, the rotor blade is attached to the hub grip by a bolt which can also serve as the folding pin and the axis of the bolt is substantially parallel to the local chordline of the rotor blade. This bolt carries the chordwise bending, torsion and centrifugal force but cannot carry beamwise bending since that load would cause the blade to rotate around the bolt. The present invention provides for an extension lug on the rotor blade tang which provides a lever surface to resist beamwise bending.

Figure 1:
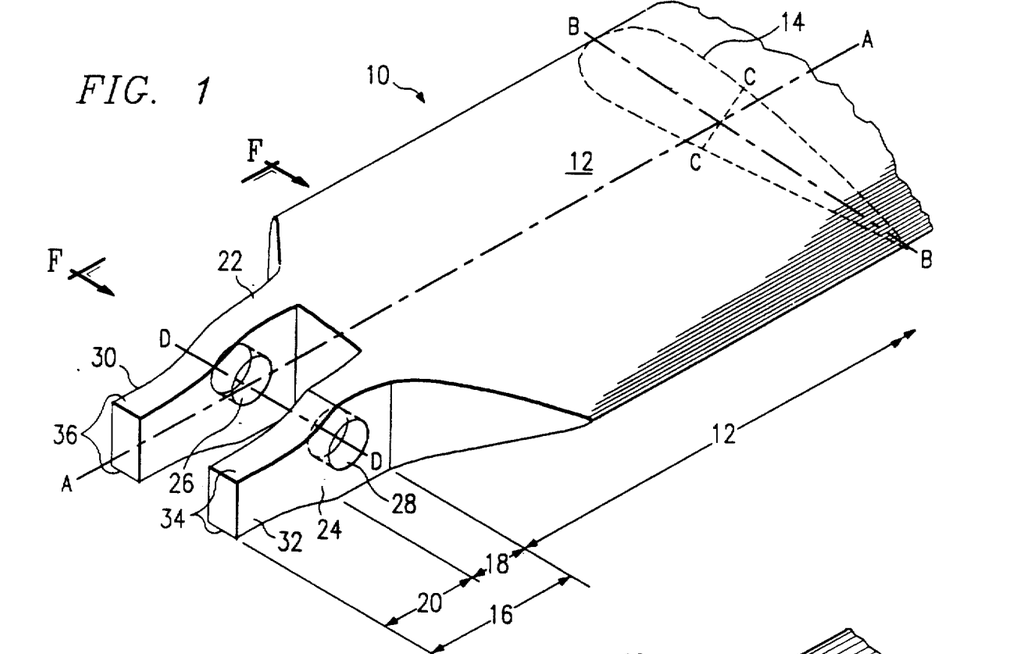
FIG. 1 is an isometric partial view of the rotor blade of the present invention.

Referring now to FIG. 1, there is illustrated an isometric view of a rotor blade of the present invention generally indicated as 10. The outboard portion 12 of the rotor blade is of typical construction and forms an airfoil 14, illustrated in phantom. The blade 10 has a longitudinal axis (beam) indicated by AA and the airfoil formed by the outboard portion of the blade has a chordline illustrated in phantom as BB and a width CC indicated as perpendicular to the chordline. At the inboard end of the blade 10 is an end tang section 16 having a mounting section 18 and extension lug section 20. The end tang, in the preferred embodiment, has two inboard protruding portions, forward end tang 22 and an aft end tang 24. End tang extensions 22 and 24 contain two apertures 26 and 28 with axis DD which is substantially parallel to the local chordline of the rotor blade for mounting the blade to the aircraft. Mounting apertures 26 and 28 allow a bolt to pass through the end tang section of the blade so that it can be mounted to the hub grip. The bolt which passes through these apertures may also serve as a folding pin about which the blade may be rotated in order to fold the blade for storage. The bolt which passes through apertures 26 and 28 carries the chordwise bending, torsion and centrifugal forces but it cannot carry beamwise bending since that load would rotate the blade about the bolt. To prevent beamwise rotation of the blade, extension lug section 20 is provided. Preferably, each of the fore and aft end tang extensions 22 and 24 have extension lugs 30 and 32 which extend inboard of the mounting apertures 26 and 28 a sufficient distance to permit interaction of the extension lugs 30 and 32 of tangs 22 and 24 with retaining structures on the hub grip. The extensions provide lever surfaces for interaction with the retaining structure. These lever surfaces 36, 34 can be coated with a self-lubricating plastic material such as tetrahydrofuran (Teflon), or other self-lubricating plastics. The surfaces can further be reinforced with bands or boxes.

Figure 2:
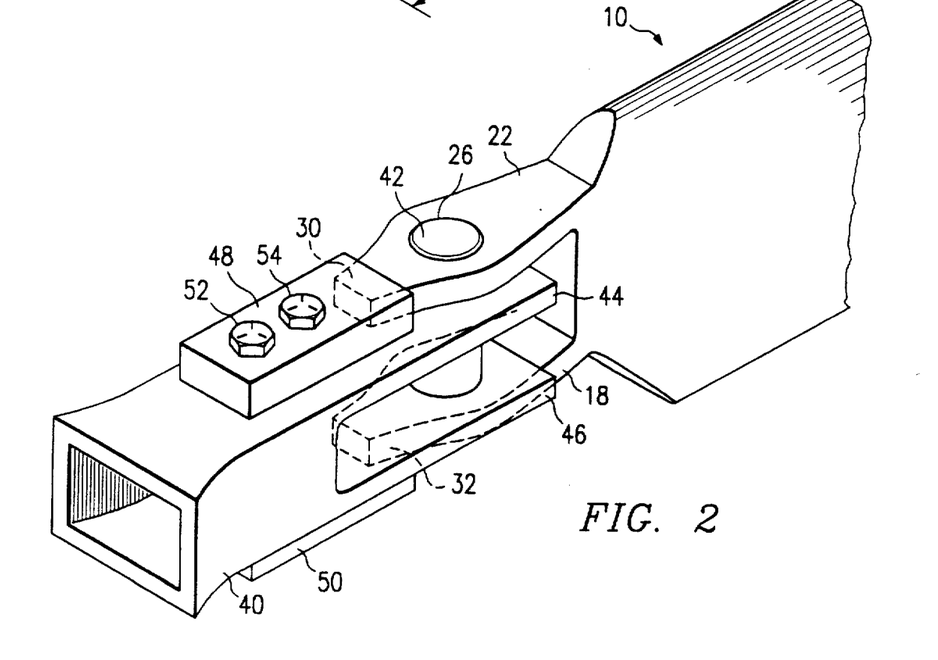
FIG. 2 is an isometric partial view of the rotor blade of the present invention mounted to a hub grip.

FIG. 2 illustrates blade 10 attached to hub grip 40 by pin 42 passing through mounting aperture 26 in fore tang section 22 and also passing through aperture 28 of aft tang section 24 (not shown). Pin 42 passes through mounting holes provided in hub grip 40 at the fore and aft extending ends 44 and 46 of the grip 40. Bending or rotation about pin 42 by blade 10 is prevented by stops 48 and 50 mounted on the blade grip 40 by suitable means such as bolts 52 and 54. The extension lugs 30 and 32 of tangs 22 and 24, shown in phantom, are held firmly in place by stops 48 and 50 to prevent rotation or beamwise bending of rotor blade 10 about pin 42. The rotor blade 10 may be folded simply by removing stops 48 and 50, either manually or with an automated mechanism, thus permitting the blade to be pivoted about pin 42. Thus, the blades of a multi-blade rotor may be folded against one another to minimize storage space.

Figure 3:
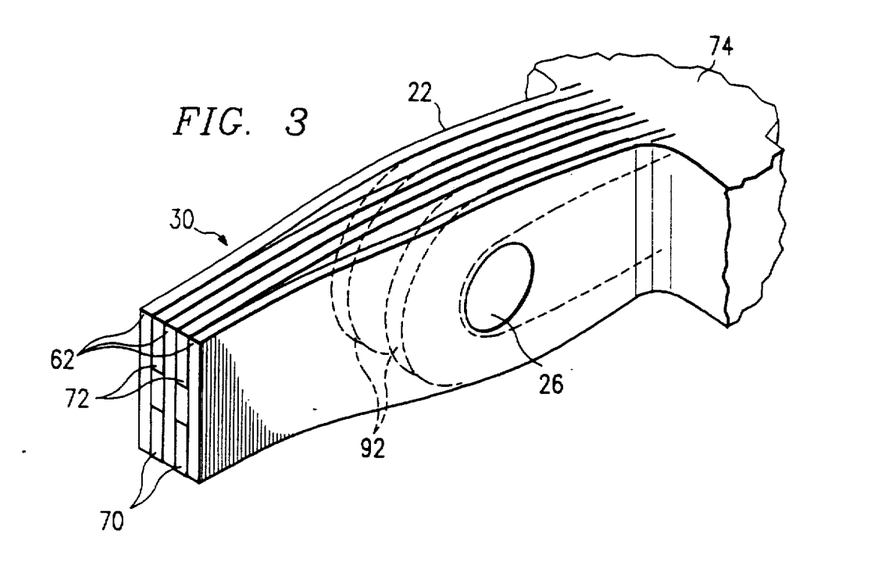
FIG. 3 is an isometric view of a portion of FIG. 1 showing the fore end tang extension.

FIG. 3 is a isometric view of a portion of rotor blade 10 indicated generally by F-F of FIG. 1. The end tang extension lug 30 of fore tang 22 illustrates the laminated feature of the present invention showing the ends of a series of inner belts 70 and 72 with shear web 62 interposed between the outer belts and adjacent to the belts. Outer belts 92 are shown in phantom. A similar construction is used for the aft end tang.

Figure 4:
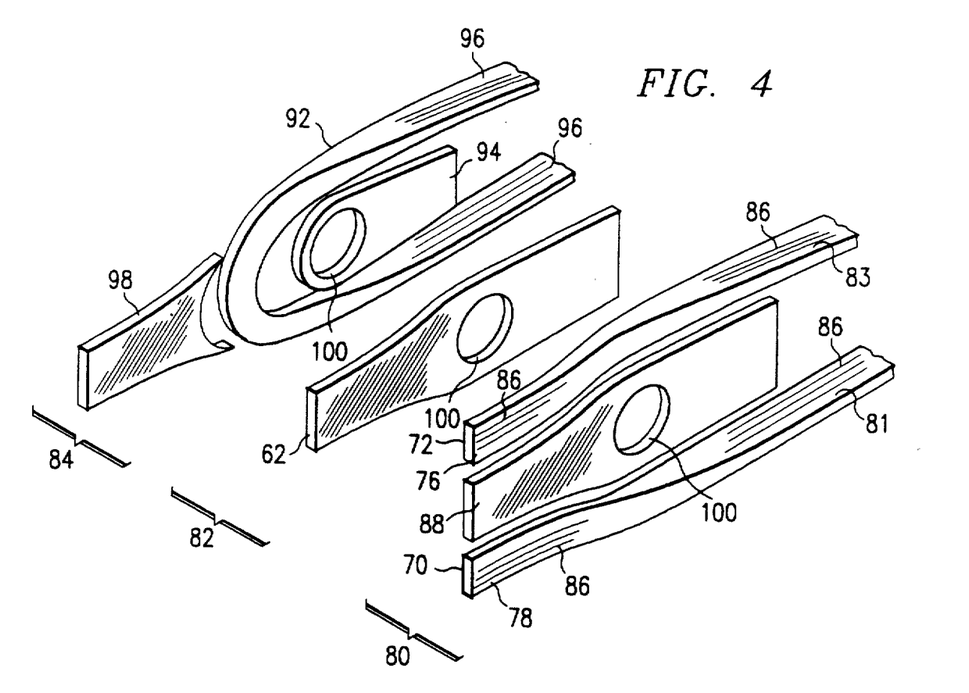
FIG. 4 is a partial isometric view illustrating the lamination of the end tang.

FIG. 4 is an exploded view of a portion of FIG. 3 to illustrate the construction of fore end tang 22. The end tang 22 is constructed by a series of laminations of which only three representative layers 80, 82 and 84 are illustrated. In inner belt layer 80 are inner belts 70 and 72. The inboard ends 76 and 78 of these belts are preferably oriented such that the widest part of the belt is perpendicular to the beam of the rotor. The outboard portions 81 and 83 of belts 70 and 72 are preferably oriented such that the widest portion is parallel to the beam of the rotor. Preferably, these belts are constructed with the reinforcement fibers 86 running substantially parallel to the beam axis of the rotor blade.

Interposed between the inner belts is inner belt filler section 88. Inner belt filler section 88 is comprised of a laminate of reinforced composite material having alternating sheets of composite material with the reinforcing fibers oriented in different directions. Preferably, the orientation of the reinforcing elements is from about $\pm 15°$ to about $\pm 90°$ from the beam of the rotor blade.

Shear web layer 82 is made of shear web 62, which is constructed of a laminate of alternating composite sheets oriented such that reinforcing elements of the sheets are oriented in different directions. Again, this orientation should be from $\pm 15°$ to about $\pm 90°$ from the beam of the rotor blade.

Adjacent to shear web layer 82 is outer belt layer 84. In the outer belt layer 84 is outer belt 92, which loops around outer loop filler section 94. The strands of reinforcing elements 96 in the outer belt 92 are in a plane substantially parallel to the beam of the rotor blade with the exception of the section of the outer belt which loops around the outer loop filler 94. Adjacent to the outer belt is inboard filler 98. Fillers 94 and 98 are constructed of laminates of composite material with alternating orientations of the reinforcing fibers, preferably from about $\pm 15°$ to about $\pm 90°$ from the beam of the rotor blade. Fillers 94 and 98 are shaped so as to conform and mate with the outer belt 92 and to the shape of the tang end.

Alternating layers may then be built up by placing another shear web layer 82 on the other side of layer 84 and then repeating layers corresponding to layers 80, 82 and 84, such as exemplified in FIG. 3. The layers do not have to be placed in any particular order and the order of the outer belt layer, inner belt layer, and shear web layer can be varied. The number of each layer utilized can also vary as needed for the size of the rotor blade, the strength required, etc. These layers are then bonded together to form the fore and aft end tang extensions and each layer is provided with an aperture 100 which forms the mounting hole of the end tang such as mounting aperture 26. Alternatively, a solid laminated end tang may be formed and mounting apertures drilled into the end tangs.

Figures 5, 6:
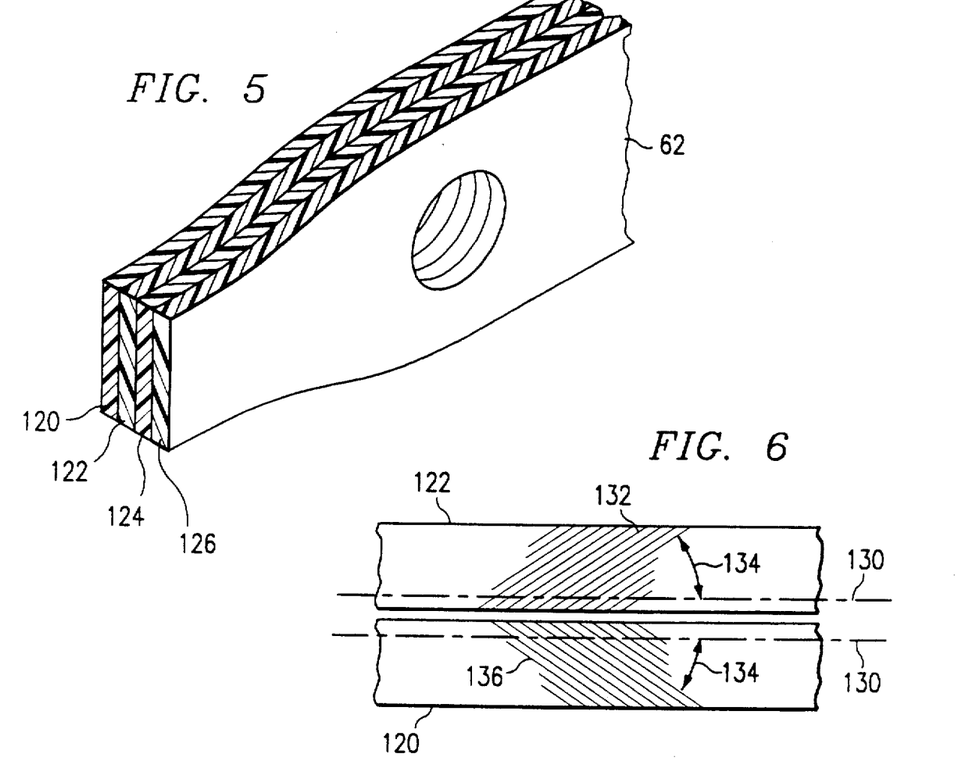
FIG. 5 is an isometric view illustrating construction of the shear webs and fillers.
FIG. 6 is an illustration of the orientation of reinforcing elements in the composite sheets.

FIG. 5 illustrates the construction of shear web 62. Construction of the fillers 88, 94 and 98 are done in a similar fashion. For purposes of illustration, shear web 62 has four sheets of reinforced composite which are laminated together. These four sheets are sheets 120, 122, 124, and 126. Generally, more than four sheets will be used, and four are used here for illustration. Typically, ten or more sheets will be laminated together. Preferably, each sheet has a unidirectional orientation of reinforcement fibers. The sheets are laminated together such that sheets adjacent to one another are oriented in different directions. The number of sheets laminated depends on the desired strength as well as the required thickness of the part. Generally, it has been found shear webs that contain about 4 to 30 layers of laminate have been found useful. Generally, at least 18 layers should be laminated together to achieve the desired strength.

FIG. 6 shows two partial sections of composite sheets 120 and 122, with reinforcing elements 132 and 136. The orientation of the axis of the reinforcing elements 132 and 136 is shown in reference to line 130 representing an axis parallel to the beam of the rotor blade. Lines 132 illustrate the long axis of the reinforcing fibers of one layer of composite material with an angle of orientation 134 referring to the angle between the longitudinal axis of the reinforcing fibers and the beam of the rotor blade. This angle (measuring the smallest angle formed with the beam line) preferably is from 15° to 90°. More preferably, the angle is from about 25° to about 50°. As illustrated, a second layer should have a longitudinal axis such as illustrated by 136 running in a direction opposite the other layer. Preferably, the orientation angle 134 should be about from ±25°-35° because it has been found that ±30° orientation is approximately as good in shear as ±45° orientation, but has better resistance to bending forces.

Referring to FIG. 4, outer belts 92 and inner belts 70 and 72 extend from the end tang over the top and bottom of the airfoil and form part of the composite structure of the airfoil in the preferred embodiment. The belts 72 and 92 are feathered together on the top of the rotor blade, such as illustrated in section 74 of FIG. 3, to form a continuous belt extending out over the beam of the rotor blade while belts 70 and 92 are feathered together on the bottom of the rotor blade to form a continuous belt extending out under the beam of the rotor blade. In the preferred embodiment, there will be a plurality of such belts employed. The outer belts serve to take centrifugal load, whereas the inner belts transfer beamwise bending. The belts are preferably constructed of reinforced composite material and generally the measurements of the belts can be varied, depending on the desired strength and construction. Also, the cross section of the belt will vary depending at different locations along the rotor blade. Belts of approximately from about 1.3 to about 4.3 inches in width and from about 0.3 to about 0.9 inches in thickness have been found suitable for use in the present invention. In general, the belts will be more squared at the inboard end and more flattened on the outboard end of the spar. For example, it has been found useful to use belts which are about 1.3 × 0.3 inches in the vicinity of the inboard end of the rotor blade, and which on the outboard end of the rotor blade are flattened to a width of about 4.3 inches and a thickness of about 0.09 inches. The composite material used to construct blade and end tang may be all of the same type of composite material, or combinations of composite material utilizing different reinforcing elements can be used. The only requirement is that the composite sheets be such that they will bond together in the curing processing. The lug extension of the rotor blade is generally machined to a desired shape after the bonding and curing process is completed. In one method of construction, the outer belts can be assembled as a single belt which loops around the end of the blade forming a rough end tang. After curing, the end portion of the end tang can be cut off, thus creating upper and lower outer belts. The portion of the layup which is cut off can then be recovered and subjected to shear testing to assure that the composite structure has the required strength and meets quality control standards.

The composite materials utilized to construct the invention are any of those materials suitable for use in aircraft manufacture. Such materials include preimpregnated fiberglass reinforced epoxy materials, as well other preimpregnated reinforced composite materials. Typical reinforcing filaments besides fiberglass include carbon, graphite, aramid fibers (Kevlar), boron and various polymeric materials. In the preferred embodiment, there are a plurality of filament wound belts utilized in the construction of the rotor. Preferably, eight or more filament wound belts are utilized. It has been found it is preferably for these belts to run the full length of the blades and are divided into two groups of four belts. The forward four belts form part of the fore blade root extension. Of these four belts, two pass around the blade mounting aperture and the remaining two belts form the principle bending load path of the root extension. Fillers and shear webs are used between the belts to complete the construction of the entire extension tang.

In a typical construction, the extension lug section 20 is of any desired length. It has been found that an extension which is from about 3% to about 7% of the length of the rotor blade from the mounting aperture to blade tip is useful.

The aft extension is constructed in a similar manner from belts as used for the fore extension. Preferably, there are four belts also in the aft extension attached in a similar manner.

Motion isolators can be attached to the blade root to permit axial and chordwise deflections in the blade root and hub to occur without transmitting significant loads in those directions. Motion isolators can be of any self-lubricating plastic materials such as Teflon fabric. Thus the blade root can be covered by a Teflon fabric applied to a reinforcing band or applied to the stop. A Teflon surface or other lubricating plastic surfaces may also be used on the interior of the pin mounting aperture to facilitate movement.

Figure 7:
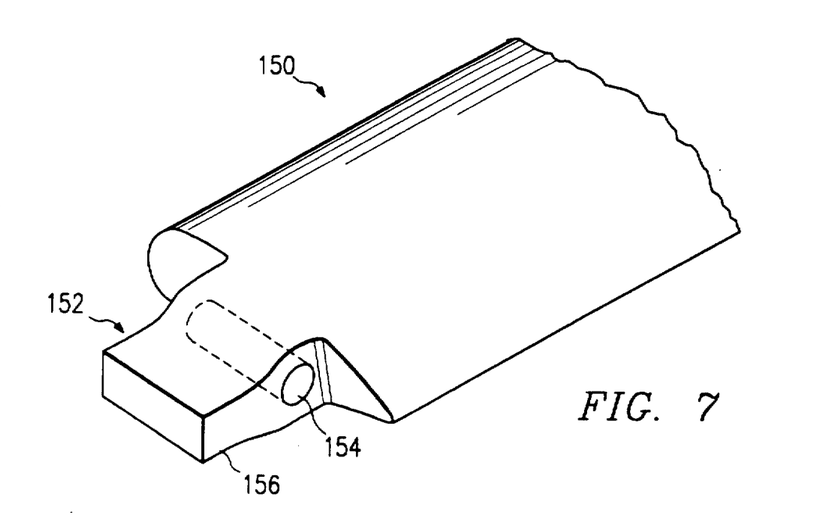
FIGS. 7 and 8 are isometric partial views of alternate embodiments.
Figure 8:
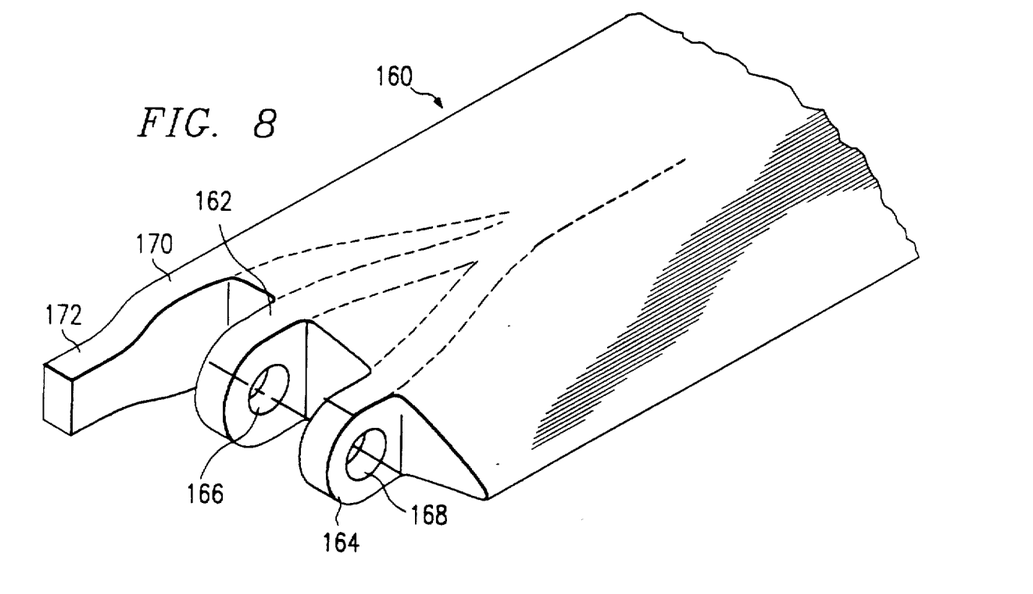

As illustrated, the end tang has two extensions. However, as shown in FIG. 7, the rotor blade 150 can be made with a single end tang extension 152 defining a mounting aperture 154 and an extension lug 156 extending inboard of the aperture. Also, the rotor blade may be constructed such that it has two end tang extensions which both define a mounting aperture but only one of which has an extension lug extending inboard of the mounting aperture to provide a lever surface. The end tang can also be constructed such that it has more than two tang end extensions. Such an embodiment can provide a number of possible combinations of end tang extensions. For example, FIG. 8 illustrates rotor blade 160 having two tang extensions 162 and 164 providing only the mounting apertures 166 and 168 being co-axially aligned. A third extension 170 provides an extension lug portion 172 extending inboard of the mounting apertures 166 and 168. If desired, a mounting aperture can also be provided in end tang extension 170.

Figure 9A:
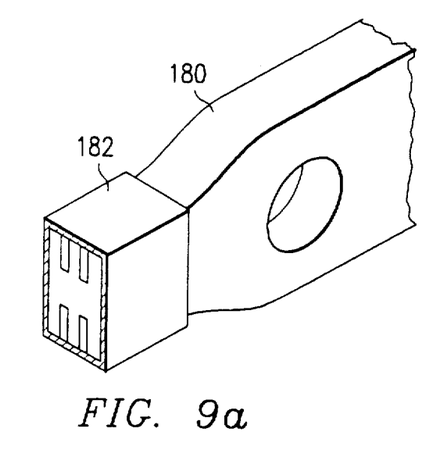
FIGS. 9a, 9b, and 9c are isometric views of various reinforcing bands applied to the extension lugs.
Figure 9B:
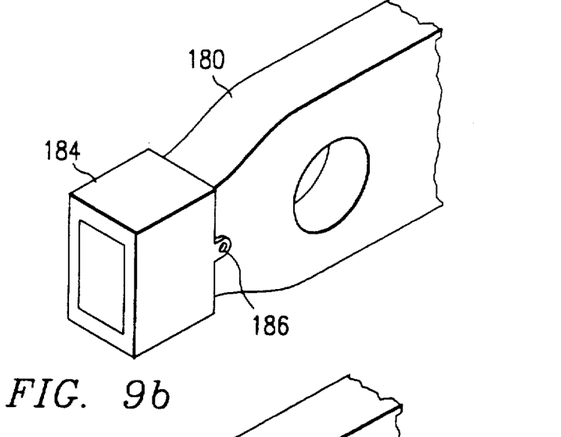
Figure 9C:
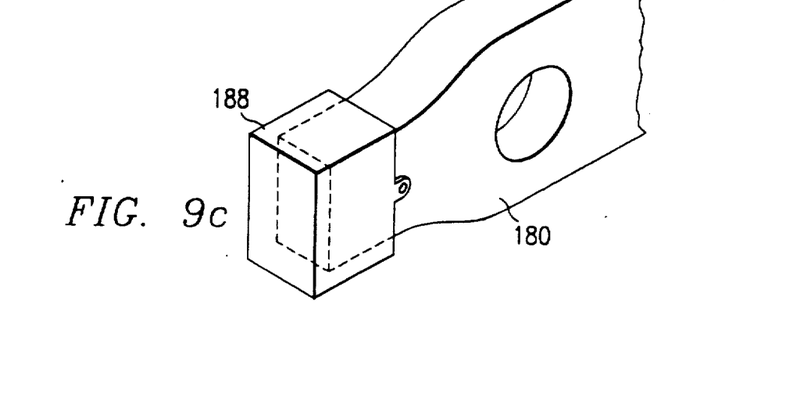

As shown in FIG. 9a, 9b, and 9c the extension lug may be protected from contact with the hub latching mechanism (stop) by covering its faying (lever) surface by a reinforcing band. FIG. 9a illustrates a polymeric reinforcing band 182 which can be made of any suitable material such as Teflon. FIG. 9b illustrates a metal reinforcing band 184 held in place by screw 186 or the reinforcing band may be in the shape of a box 188 (FIG. 9c) over the end of the extension tang 180. This reinforcing band or box may be interference fit onto the extension lug and retained by a screw. The reinforcing band serves to retard initiation of local bearing or shear failure in the lug end. The reinforcing band may be made of metal, composite, or elastomeric material. Preferably, metal is used to afford the greatest protection from local deformation of the extension lug.

Although a preferred embodiment of the invention has been described in the foregoing detailed description and illustrated in the accompany drawings, it will be understood that the invention is not limited to the embodiment disclosed, but is capable of numerous rearrangements, modifications, and substitutions of parts and elements without departing from the spirit of the invention. The present invention is therefore intended to encompass such rearrangements, modifications and substitutions of parts and elements as fall within the spirit and scope of the invention.

What is claimed is:

1. A helicopter rotor blade comprising:
   (a) an outboard end forming an airfoil surface defining a chordline and beamline and forming a blade tip; and
   (b) an end tang forming the inboard end of the helicopter rotor blade which defines a mounting aperture having an axis substantially parallel to the chordline of the outboard end and an extension lug portion extending inboard of said mounting aperture and having lever surfaces oriented with respect to said beamline to resist bending of the helicopter rotor blade along the beamline, said extension lug portion having a length which is from 3% to 7% of the length of the helicopter rotor blade as measured from the mounting aperture to the blade tip.

2. The helicopter rotor blade of claim 1, further comprising a reinforcing band attached to the extension lug portion.

3. A rotor blade comprising:
   (a) an outboard end forming an airfoil surface defining a chordline and beam; and
   (b) an end tang forming an inboard end of the rotor blade and attached to said outboard end, said tang end having fore and aft spaced apart extensions extending in a plane substantially parallel to the beam of the outboard end, each extension defining a mounting aperture, said aperture being co-axially aligned on an axis substantially parallel to the chordline of the outboard end, each of said fore and aft extensions extending inboard of said mounting apertures to define an extension lug having lever surfaces which are coated with a self-lubricating plastic material.

4. The rotor blade of claim 3, further comprising a reinforcing band attached to the at lease one extension lug.

5. A helicopter rotor blade for mounting to a hub grip of a helicopter comprising:
   (a) an outboard end defining an airfoil surface which has a chordline and beamline; and
   (b) an end tang attached to the outboard end having at least two spaced apart extensions extending inboard from said outboard end, at least one of said spaced apart extensions defining a mounting aperture with an axis substantially parallel to the chordline, and at least one of said spaced apart extensions defining an extension lug extending inboard of said mounting aperture to provide at least one lever surface to coact with the hub grip to resist beamwise bending of the helicopter rotor blade.

6. A helicopter rotor blade for mounting to a hub grip of a helicopter, comprising:
   (a) an outboard portion of composite material forming an airfoil surface and defining a chordline and beam;
   (b) a first plurality of filament reinforced composite belts extending inboard from the outboard portion of the airfoil forming a fore tang extension defining a mounting aperture having an axis substantially parallel to the chordline of the outboard portion, said fore tang extension extending further inboard of said mounting aperture to provide an extension lug having lever surfaces to coact with the hub grip to resist bending of the helicopter rotor blade along the beam thereof; and
   (c) a second plurality of filament reinforced composite belts extending inboard of said outboard portion forming an aft tang extension spaced apart from said fore tang extension in a direction along the chordline and defining a mounting aperture having an axis substantially parallel to the chordline of the outboard portion, and said aft tang extension further extending inboard of the mounting aperture formed thereby to provide an extension lug having lever surfaces to coact with said hub grip to resist bending of the helicopter rotor blade along the beam thereof.

7. The helicopter rotor blade of claim 6, wherein composite material is selected from composite sheets having reinforcing elements selected from the group consisting of carbon, graphite, boron, fiberglass, and polymeric filaments, and combinations thereof.

8. The helicopter rotor blade of claim 5, further comprising a reinforcing band attached to the extension lug of said fore tang extension.

9. The helicopter rotor blade of claim 6, further comprising a reinforcing band attached to the extension lug of said aft tang extension.

10. A rotor blade comprising:
   (a) an outboard end made of composite material defining an airfoil surface which has a chordline and beam;
   (b) a first plurality of composite filament wound belts extending inboard from said outboard end and forming a first end tang, said first end tang defining a first mounting aperture and a first extension lug extending inboard of said first mounting aperture, said first mounting aperture having an axis substantially parallel to said chordline of said outboard end, said first extension lug formed from a laminate comprising:
      (i) an inner belt layer having two inner belts extending from said outboard end which are spaced apart by an inner belt filler element of reinforced composite material;

(ii) a shear web layer of composite material adjacent to said inner belt layer and lying in a plane generally perpendicular to said chordline of said outboard end;

(iii) an outer belt layer formed by an outer belt which loops around said first mounting aperture, said loop being held in a spaced apart configuration by a filler element of reinforced composite material and an inboard filler element of reinforced composite material extending inboard from the inboard end of said outer belt to form part of the first extension lug; and (iv) at least one additional layer as defined in (i), (ii), or (iii) arranged in a predetermined order and laminated together with the other layers.

11. The rotor blade of claim 10, further comprising:
(a) a second plurality of composite filament wound belts extending inboard from said outboard end and forming a second end tang spaced apart from said first end tang and defining a second mounting aperture in alignment with said first mounting aperture and a second extension lug extending inboard of said second mounting aperture, said second mounting aperture having an axis substantially parallel to said chordline of said outboard end, said second extension lug formed from a laminate comprising:

(i) an inner belt layer having two inner belts extending from said outboard end which are spaced apart by an inner belt filler element of reinforced composite material;

(ii) a shear web layer of composite material adjacent to said inner belt layer and lying in a plane generally perpendicular to said chordline of said outboard end;

(iii) an outer belt layer formed by an outer belt which loops around said second mounting aperture, said loop being held in a spaced apart configuration by a filler element of reinforced composite material and an inboard filler element of reinforced composite material extending inboard from the inboard end of said outer belt to form part of the second extension lug; and (iv) at least one additional layer as defined in (i), (ii) or (iii) arranged in a predetermined order and laminated together with the other layers.

12. The rotor blade of claim 11, wherein said reinforced composite material has reinforcing elements selected from the group consisting of carbon, graphite, boron, aramid fibers, and combinations thereof.

13. The rotor blade of claim 10, wherein said filler elements are oriented such that the reinforcing elements are oriented from ±15° to ±90° from the beamline of said rotor blade.

14. The rotor blade of claim 11, wherein said filler elements are oriented such that the reinforcing elements are oriented from ±15° to ±90° from the beamline of said rotor blade.

15. The rotor blade of claim 10, wherein said filler elements and at lease one shear web layer are oriented such that the reinforcing elements are oriented from ±25° to ±35° from the beamline of said rotor blade.

16. The rotor blade of claim 11, wherein said filler elements and shear web layer are oriented such that the reinforcing elements are oriented from ±25° to ±35° from the beamline of said rotor blade.

17. The rotor blade of claim 10, further comprising a reinforcing band attached to the first extension lug.

18. The rotor blade of claim 11, further comprising a reinforcing band attached to the second extension lug.

* * * * *

UNITED STATES PATENT AND TRADEMARK OFFICE
CERTIFICATE OF CORRECTION

PATENT NO. : 5,074,753
DATED : December 24, 1991
INVENTOR(S) : Covington, et al.

It is certified that error appears in the above-identified patent and that said Letters Patent is hereby corrected as shown below:

Column 6, line 24, delete "preferably" and insert therefore --preferable--.

Column 8, claim 8, line 48, delete "5" and insert therefore --6--.

therefore --layers--.

Column 10, claim 16, line 29, delete "layer" and insert therefore --layers--.

Signed and Sealed this

Ninth Day of November, 1993

Attest:

BRUCE LEHMAN

Attesting Officer     Commissioner of Patents and Trademarks